(12) United States Patent
Schwabl et al.

(10) Patent No.: US 10,850,896 B2
(45) Date of Patent: Dec. 1, 2020

(54) VALVE DEVICE FOR AT LEAST ONE LIQUID PLASTIC COMPONENT

(71) Applicant: Henkel AG & Co. KGaA, Düsseldorf (DE)

(72) Inventors: Christian Schwabl, Bregenz (AT); Mario Metzler, Lustenau (AT)

(73) Assignee: HENKEL AG & CO. KGAA, Düsseldorf (DE)

( * ) Notice: Subject to any disclaimer, the term of this patent is extended or adjusted under 35 U.S.C. 154(b) by 115 days.

(21) Appl. No.: 15/740,931

(22) PCT Filed: Jun. 24, 2016

(86) PCT No.: PCT/AT2016/050224
§ 371 (c)(1),
(2) Date: Dec. 29, 2017

(87) PCT Pub. No.: WO2017/004633
PCT Pub. Date: Jan. 12, 2017

(65) Prior Publication Data
US 2018/0339817 A1     Nov. 29, 2018

(30) Foreign Application Priority Data

Jul. 3, 2015   (AT) .................................... 431/2015

(51) Int. Cl.
| | |
|---|---|
| *B65D 47/20* | (2006.01) |
| *B29C 45/28* | (2006.01) |
| *B29C 45/23* | (2006.01) |
| *F16K 25/04* | (2006.01) |

(Continued)

(52) U.S. Cl.
CPC ........ *B65D 47/2056* (2013.01); *B29C 45/231* (2013.01); *B29C 45/2806* (2013.01); *F16K 1/38* (2013.01); *F16K 25/04* (2013.01); *F16K 37/0041* (2013.01); *B29C 2045/2858* (2013.01)

(58) Field of Classification Search
CPC ....... B65D 47/2056; F16K 25/04; F16K 1/38; F16K 37/0041; B29C 45/2806; B29C 2045/2858; B29C 45/231
See application file for complete search history.

(56) References Cited

U.S. PATENT DOCUMENTS

| | | | |
|---|---|---|---|
| 4,073,469 A | 2/1978 | Kodric | |
| 4,416,608 A | 11/1983 | Deardurff | |
| 5,219,512 A | 6/1993 | Tsutsumi | |

(Continued)

FOREIGN PATENT DOCUMENTS

| | | |
|---|---|---|
| CN | 201371543 | 12/2009 |
| CN | 102555165 | 7/2012 |

(Continued)

OTHER PUBLICATIONS

International Search Report dated Oct. 20, 2016 in International (PCT) Application No. PCT/AT2016/050224.

*Primary Examiner* — Donnell A Long
(74) *Attorney, Agent, or Firm* — Wenderoth, Lind & Ponack, L.L.P.

(57) ABSTRACT

A valve mechanism for at least one liquid plastic component or liquid plastic, includes a closure device that includes a needle to be pressed against a seat in order to close a valve opening in the valve mechanism. The needle and/or seat is designed or mounted in such a way as to be resilient.

14 Claims, 4 Drawing Sheets

(51) Int. Cl.
*F16K 1/38* (2006.01)
*F16K 37/00* (2006.01)

(56) References Cited

U.S. PATENT DOCUMENTS

| | | | |
|---|---|---|---|
| 5,248,460 A | 9/1993 | Tsutsumi | |
| 5,884,705 A * | 3/1999 | Hill, Jr. | E21B 34/101 166/324 |
| 6,007,049 A * | 12/1999 | Wass | F16K 1/302 251/144 |
| 6,253,957 B1 * | 7/2001 | Messerly | B05C 5/001 222/1 |
| 7,694,855 B2 * | 4/2010 | Chastine | B05C 5/001 137/625.44 |
| 8,449,287 B2 | 5/2013 | Catoen | |
| 8,708,246 B2 | 4/2014 | Dunlap et al. | |
| 9,005,509 B2 | 4/2015 | Galati et al. | |
| 9,011,736 B2 | 4/2015 | de Oliveira Antunes et al. | |
| 9,144,929 B2 | 9/2015 | Tan et al. | |
| 9,205,587 B2 | 12/2015 | de Oliveira Antunes et al. | |
| 9,327,307 B2 | 5/2016 | Dunlap et al. | |
| 9,427,905 B2 | 8/2016 | Tan et al. | |
| 9,440,389 B2 | 9/2016 | Galati et al. | |
| 9,492,960 B2 | 11/2016 | Galati | |
| 9,498,909 B2 | 11/2016 | Moss et al. | |
| 9,517,487 B2 | 12/2016 | Dunlap et al. | |
| 9,604,399 B2 | 3/2017 | Yang et al. | |
| 9,623,598 B2 | 4/2017 | Galati et al. | |
| 9,636,858 B2 | 5/2017 | de Oliveira Antunes et al. | |
| 9,662,820 B2 | 5/2017 | Antunes et al. | |
| 9,682,504 B2 | 6/2017 | Tan et al. | |
| 9,682,507 B2 | 6/2017 | Schreyer et al. | |
| 9,724,861 B2 | 8/2017 | Antunes et al. | |
| 9,738,024 B2 | 8/2017 | Antunes et al. | |
| 9,987,782 B2 | 6/2018 | Spuller | |
| 2004/0036048 A1 * | 2/2004 | Petersen | F02M 51/0685 251/129.15 |
| 2005/0145559 A1 * | 7/2005 | Gutman | B01D 27/005 210/437 |
| 2008/0101669 A1 * | 5/2008 | Jeung | A61B 6/08 382/128 |
| 2010/0047379 A1 | 2/2010 | Selak et al. | |
| 2011/0140024 A1 * | 6/2011 | McCoy | F16K 5/0694 251/315.1 |
| 2012/0115705 A1 * | 5/2012 | Sharon | B04B 5/0407 494/4 |
| 2012/0248644 A1 | 10/2012 | de Oliveira Antunes et al. | |
| 2012/0248652 A1 | 10/2012 | Galati et al. | |
| 2013/0105597 A1 | 5/2013 | Dunlap et al. | |
| 2014/0035563 A1 | 2/2014 | Tan et al. | |
| 2014/0046465 A1 | 2/2014 | de Oliveira Antunes et al. | |
| 2014/0197210 A1 | 7/2014 | Dunlap et al. | |
| 2014/0209626 A1 | 7/2014 | Dunlap et al. | |
| 2014/0210119 A1 | 7/2014 | Galati et al. | |
| 2014/0300019 A1 | 10/2014 | Moss et al. | |
| 2014/0319729 A1 | 10/2014 | Galati | |
| 2014/0353875 A1 | 12/2014 | Tan et al. | |
| 2015/0083955 A1 * | 3/2015 | Lenhert | F16K 1/2263 251/306 |
| 2015/0091198 A1 | 4/2015 | de Oliveira Antunes et al. | |
| 2015/0091213 A1 | 4/2015 | Galati et al. | |
| 2015/0158227 A1 | 6/2015 | Schreyer et al. | |
| 2015/0239161 A1 | 8/2015 | Antunes et al. | |
| 2015/0239162 A1 | 8/2015 | Yang et al. | |
| 2015/0300515 A1 | 10/2015 | Raggi et al. | |
| 2015/0306803 A1 | 10/2015 | Antunes et al. | |
| 2015/0360406 A1 | 12/2015 | Tan et al. | |
| 2015/0377383 A1 | 12/2015 | Feinauer et al. | |
| 2016/0052184 A1 | 2/2016 | Galati et al. | |
| 2016/0052186 A1 | 2/2016 | de Oliveira Antunes et al. | |
| 2016/0082634 A1 | 3/2016 | Tan | |
| 2016/0131264 A1 * | 5/2016 | Bregazzi | F16K 1/34 251/333 |
| 2016/0151949 A1 | 6/2016 | Antunes et al. | |
| 2016/0229102 A1 | 8/2016 | Galati | |
| 2016/0238156 A1 * | 8/2016 | Hubenschmidt | F16K 37/0008 |
| 2016/0325474 A1 | 11/2016 | Tan et al. | |
| 2016/0346980 A1 | 12/2016 | Galati et al. | |
| 2016/0361856 A1 | 12/2016 | Tan et al. | |
| 2017/0021540 A1 | 1/2017 | Galati | |
| 2017/0028604 A1 | 2/2017 | Moss et al. | |
| 2017/0100867 A1 | 4/2017 | Tan et al. | |
| 2017/0100868 A1 | 4/2017 | Tan et al. | |
| 2017/0100869 A1 | 4/2017 | Tan et al. | |
| 2017/0120493 A1 | 5/2017 | Lee et al. | |
| 2017/0144351 A1 | 5/2017 | Tan et al. | |
| 2017/0151701 A1 | 6/2017 | Lee et al. | |
| 2017/0151703 A1 | 6/2017 | de Oliveira Antunes et al. | |
| 2017/0165890 A1 | 6/2017 | Yang et al. | |
| 2017/0173836 A1 | 6/2017 | Galati et al. | |
| 2017/0182692 A1 | 6/2017 | Tan et al. | |
| 2017/0190090 A1 | 7/2017 | de Oliveira Antunes et al. | |
| 2017/0210048 A1 | 7/2017 | de Oliveira Antunes et al. | |
| 2017/0246784 A1 | 8/2017 | Tan et al. | |
| 2017/0305050 A1 | 10/2017 | Antunes et al. | |
| 2017/0305052 A1 | 10/2017 | de Oliveira Antunes et al. | |
| 2017/0326766 A1 | 11/2017 | Tan | |
| 2017/0341283 A1 | 11/2017 | Tan et al. | |

FOREIGN PATENT DOCUMENTS

| | | |
|---|---|---|
| CN | 104552845 | 4/2015 |
| DE | 2 150 717 | 4/1973 |
| DE | 29 15 291 | 10/1980 |
| DE | 88 12 456 | 2/1989 |
| DE | 10 2012 211 283 | 1/2014 |
| DE | 20 2014 102 940 | 8/2014 |
| EP | 2 586 536 | 5/2013 |
| JP | 54-163178 | 11/1979 |
| JP | 3022433 | 3/1996 |
| JP | 2000-084982 | 3/2000 |
| JP | 2006-35686 | 2/2006 |
| RU | 2 008 222 | 2/1994 |
| RU | 2 045 403 | 10/1995 |
| SU | 163757 | 7/1964 |
| WO | 2014/080346 | 5/2014 |
| WO | 2014/085321 | 6/2014 |

* cited by examiner

VALVE DEVICE FOR AT LEAST ONE LIQUID PLASTIC COMPONENT

BACKGROUND OF THE INVENTION

The invention concerns a valve device, a metering valve having such a valve device, and a metering apparatus having such a valve device and/or such a metering valve.

Such a valve device, metering valves or metering apparatuses preferably serve for influencing flows of liquid plastic or liquid plastic components. Metering valves are for example part of metering apparatuses which serve for the production of bonded joints, casting applications or in particular foamed seals.

Hitherto both the needle and also the seat were made of metal, in which respect it was already known for the seat to be made from a softer metal than the needle. After several hundred closure processes, the softer seat is plastically adapted to the contour of the needle. If the needle and/or the seat is replaced, however, a reliable closure process no longer occurs. In addition, it is time-consuming to carry out the necessary, several hundred closure processes before the valve device is brought into operation. If foreign bodies are jammed between the needle and the seat, the foreign body can cause a notch or a recess in the seat so that reliable closure is no longer guaranteed. Admittedly, a certain deformation naturally also occurs when using a metal needle or a metal seat, but that is not identifiable by measurement.

SUMMARY OF THE INVENTION

The object of the present invention is to provide a valve device, a metering valve or a metering apparatus, in which the above-discussed disadvantages do not arise.

That object is attained by a valve device, a metering valve having such a valve device, and a metering apparatus having such a valve device and/or such a metering valve. Advantageous embodiments of the present invention are recited in the appendant claims.

The invention makes it possible, while ensuring resistance to wear:

For the needle and the seat to be pressed against each other in such a way that a reliable closure effect is permitted immediately even without time-consuming preparation procedures (i.e., the needle is pressed into the valve opening within the seat), For the needle and the seat to be over-pressed, if necessary (i.e., the needle can move relative to the seat beyond the actual sealing point), and To carry out a measurement which permits assessment of the closure state, by virtue of the yielding nature and the relative movement linked thereto of the needle and the seat.

In a first variant, the needle and/or the seat are themselves yielding. For example, the needle and/or the seat at least portion-wise comprise plastic. That plastic can in principle be plastically deformable as the needle is inserted into the valve opening. Preferably, however, the plastic is elastically or at least part-elastically deformable. Part-elastic deformability is used to mean that only a small region is also plastically deformable. Therefore, the plastic does not have to be elastically deformable over the entire extent. Above all, therefore, end regions or partial regions can be at least partially plastically deformable. Any notches or recesses in the seat and/or the needle are compensated for by the pressing pressure. Preferably, the plastic of the needle and/or the seat is PEK (polyetherketone), preferably PEEK (polyetheretherketone).

In a second variant which can possibly also be used jointly with the first variant, the needle and/or the seat is/are mounted yieldingly by a needle mounting and by a seat mounting respectively. The needle mounting and/or the seat mounting has/have a force storage member or an elastically or part-elastically deformable portion.

Particularly preferably, there is provided at least one sensor for—preferably contact-less—position monitoring of the position of the needle and/or the seat and/or the needle mounting and/or the seat mounting, the status signals of which can be fed (transmitted) to an evaluation device which from the signals determines a signal which is characteristic of the closure action. For example, stored in the evaluation device can be at least two positions which are characteristic of predetermined closure states of the closure device.

In a metering valve according to the invention, a discharge opening of the metering valve is closeable by the at least one valve device. Alternatively or additionally, an intake opening of a recirculation line is closeable by the at least one valve device.

BRIEF DESCRIPTION OF THE DRAWINGS

Further details and advantages of the invention are described more fully hereinafter in the specific description with reference to the embodiments by way of example illustrated in the drawings, in which:

FIG. 6a shows a metering device having a storage container and metering valve; while FIG. 6b shows a metering valve having two valve devices.

DETAILED DESCRIPTION OF THE INVENTION

Figure 1:
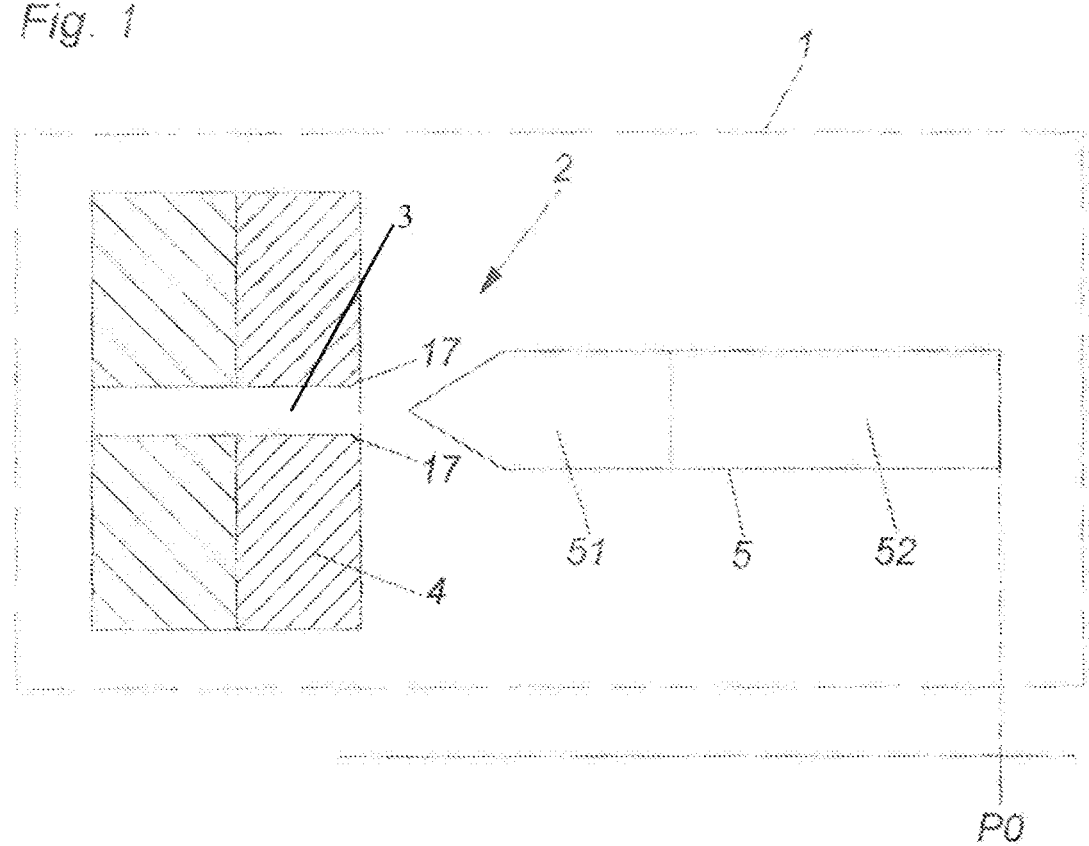
FIG. 1 shows a diagrammatically illustrated valve device having a valve opening.

The valve device of FIG. 1 includes a closure device 2 for closing the valve opening 3, having a seat 4 and a needle 5. In the illustrated embodiment, the needle 5 can have a yielding design in its entirety. For example, the needle 5 can comprise a suitable plastic or—as indicated by the dotted line—it can have a yielding design only portion-wise (for example, only in the front region 51 or in the rear region 52). The seat 4 can comprise either a non-yielding material such as metal or a yielding material, for example, a suitable plastic. It can be seen that the seat 4 has a (peripherally extending) bevel 17 to reduce the surface pressure in the region of the contact location with the needle 5. In the structure illustrated in FIG. 1, the valve opening 3 is completely opened and the needle 5 has no contact with the seat 4, which corresponds to the position P0 of the needle 5.

Figure 2:
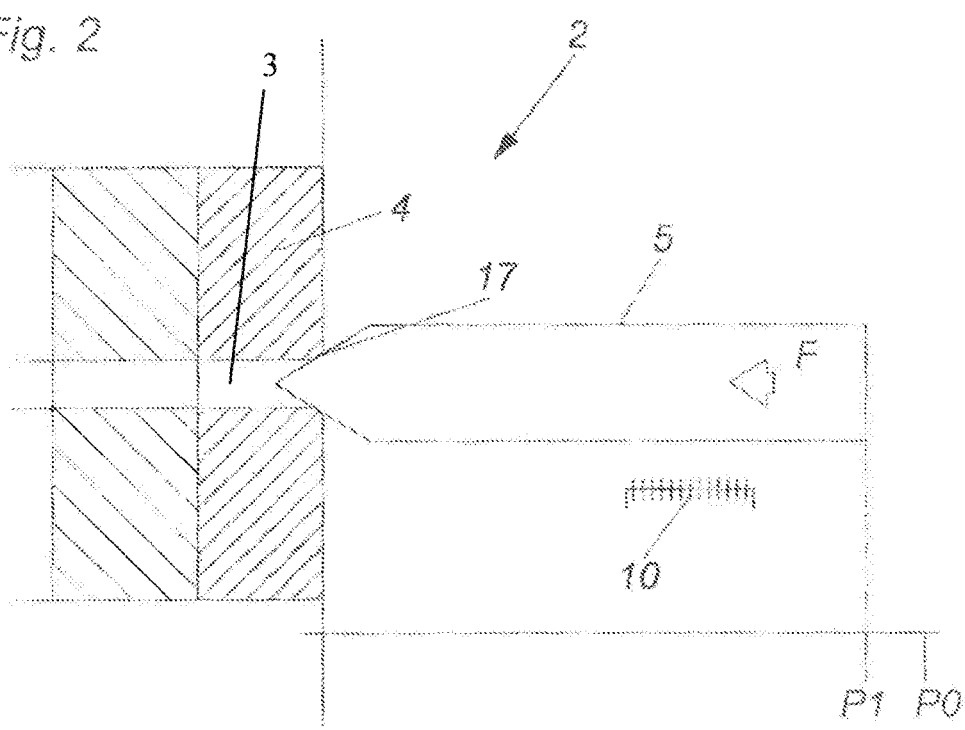
FIG. 2 shows the valve device of FIG. 1 in an altered state.

In the altered state shown in FIG. 2, the needle 5 has been moved relative to the seat 4 to such an extent that the needle 5 contacts the seat 4 without contact pressure or pressing force (i.e., an initial seating position). The contact pressure (given by the pressing force F divided by the area of the bevel 17) is produced by a drive device (not shown here) which is, for example, pneumatic, hydraulic, or force storage means-based. The position shown in FIG. 2 corresponds to the first closed position P1 of the needle 5.

Figure 3:
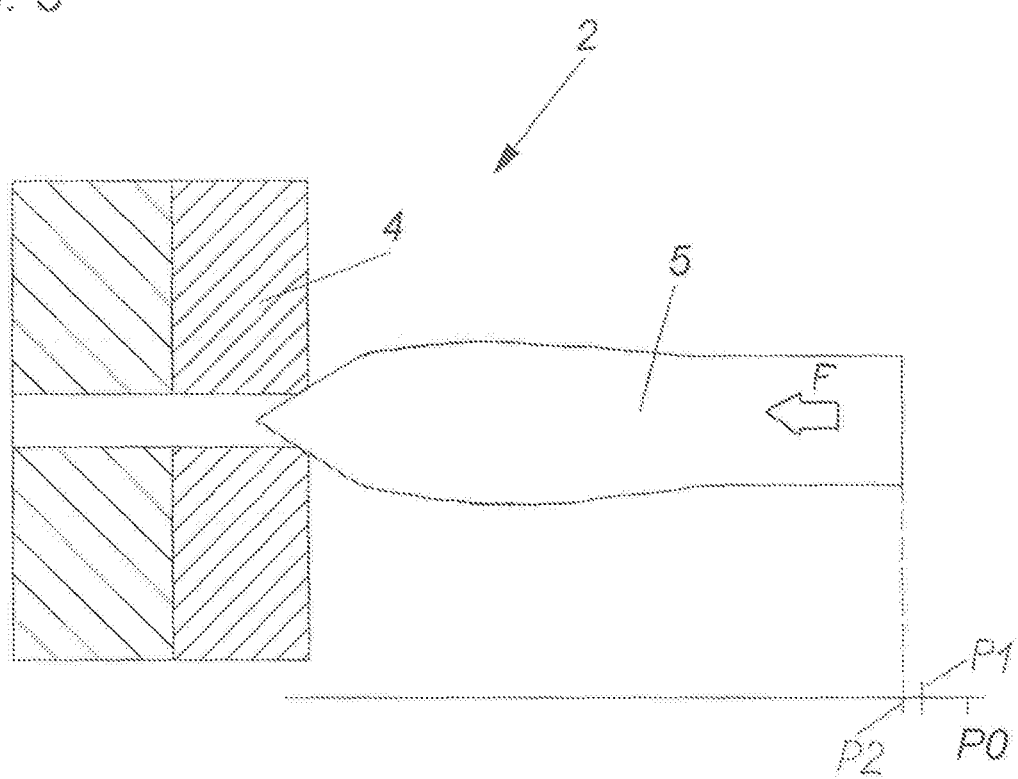
FIG. 3 shows the valve device illustrated in FIGS. 1 and 2 in a state in which the needle is pressed against the seat with the predetermined contact pressure.

In the position of the valve device 1 shown in FIG. 3, the needle 5 has been pressed against the seat 4 with a predetermined contact pressure (first pressing force), and this position corresponds to the initial seating second closed position P2 of the needle 5.

Figure 4:
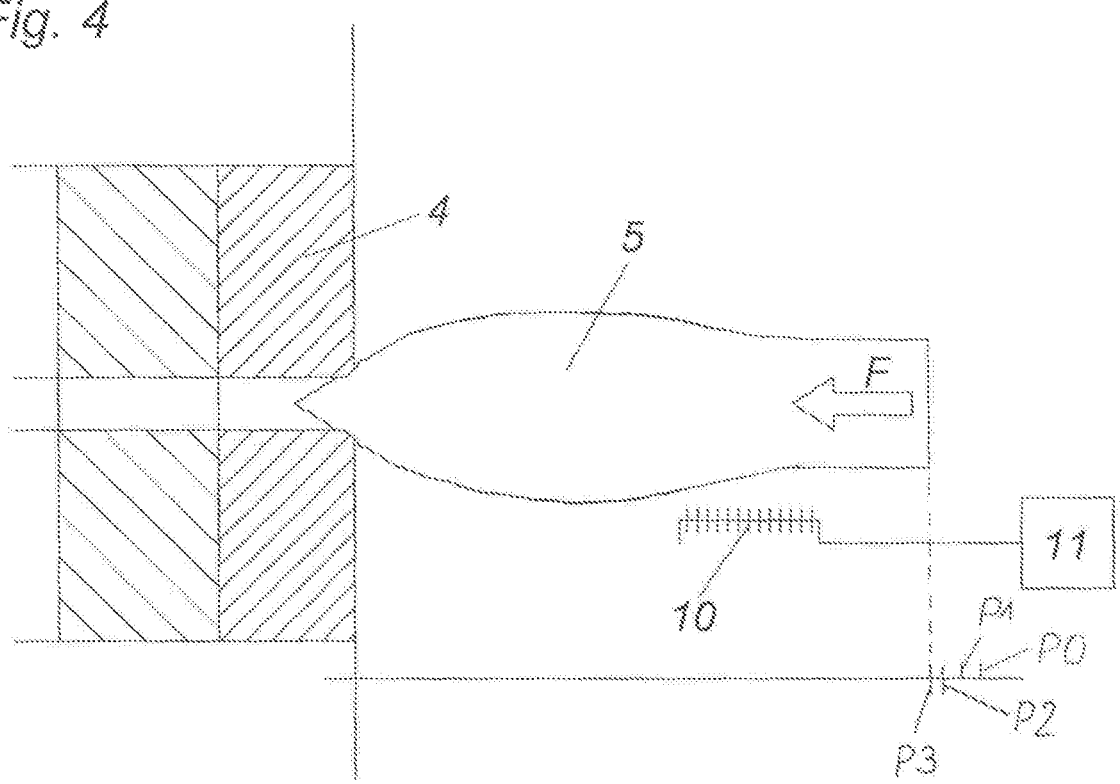
FIG. 4 shows the valve device illustrated in FIGS. 1, 2 and 3 in a state in which the needle is over-pressed in relation to the seat.

Due to the yielding nature of the needle 5, over-pressing of the needle 5 in relation to the seat 4 as shown in FIG. 4 involves pressing the needle 5 against the seat 4 with a second pressing force greater than the first pressing force, resulting in deformation of the needle 5, which is shown on an exaggerated scale. In other words, the needle 5 can move relative to the seat 4 in a closing direction to an over-pressed third closed position P3 beyond an initial seating second closed position P2. Any notches or recesses in the needle 5 and/or the seat 4 can be compensated by the deformation of the needle 5, which ensures reliable closure of the valve opening 3 by the closure device 2. This position corresponds to the over-pressed third closed position P3 of the needle 5.

The change in position from P2 to P3 caused by over-pressing the needle 5, can be readily measured, for example, by a sensor 10 which is illustrated by way of example and which is connected to an evaluation device 11 so that a status signal is transmitted to/received by the evaluation device 11 based on the monitoring. If a calibration operation is carried out, the evaluation device 11 knows which of the positions of the needle 5 corresponds to reliable closure of the closure device 2. By application of the spring law with a known spring stiffness, it is also possible to assess how great the corresponding contact pressing force F or the contact pressure is (i.e., the evaluation unit determines a characteristic of the operation of the closure device 2). It may, however, be sufficient to know that P3 is greater than P2 by a predetermined amount (without also determining the contact pressing force F).

A numerical (non-limiting) example is as follows:
P0=−2 mm
P1=0 mm
P2=0.05 mm
P3=0.10 mm
Inside diameter of the bevel=2 mm
Thickness (diameter) of the needle=5 mm
Length of the needle=20 mm.

Figure 5:
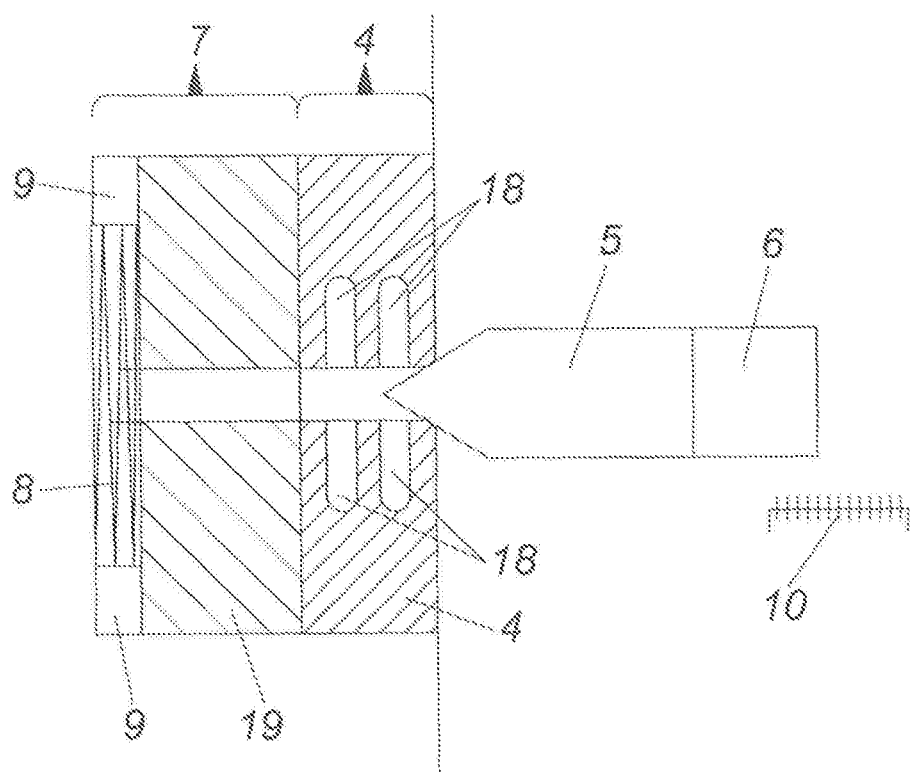
FIG. 5 shows a valve device to be arranged in a housing (not shown).

Alternative configurations of the seat 4 and/or the needle 5 are shown in FIG. 5 showing a valve device 1 in a housing (not shown). Possible variants of the yielding nature of the seat 4 and/or the yielding seat mounting 7 are cumulatively shown on the left-hand side of FIG. 5. The illustrated variants can also be used individually or in any combination.

In particular, it is possible to see in FIG. 5:
successively arranged cross-sectional weakenings 18 forming the yielding configuration of the seat 4;
yielding, part-elastic or elastic layer 19 forming the yielding seat mounting 7, for example including PEK, PEEK, PU (polyurethane), rubber, silicone, and so forth;
a force storage member 8 in the form of a compression spring and a preferably elastically deformable portion 9 which is shown only portion-wise and which can be provided instead of or in addition to the force storage member 8 to provide the yielding configuration of the seat 4 and/or the yielding seat mounting 7.

The measures described and illustrated for the seat mounting 7 can also be used additionally or alternatively for the only diagrammatically illustrated needle mounting 8.

Figures 6A, 6B:
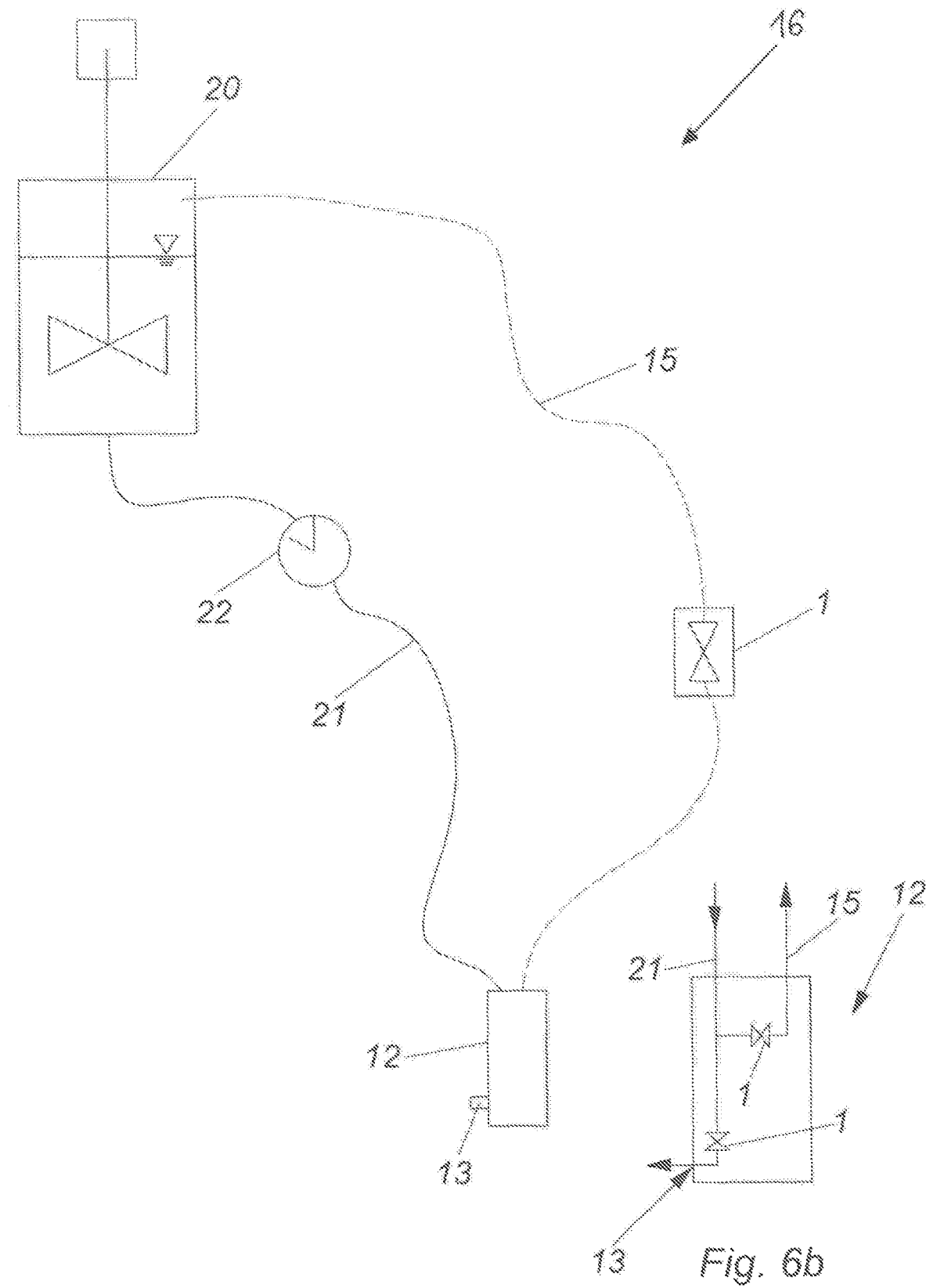

FIG. 6a shows a metering device 16 having a storage container 20 for a liquid plastic or a liquid plastic component and a metering valve 12. The liquid plastic or the liquid plastic component can be conveyed from the storage container 20 by a pump 22 to a metering valve 12 by a line 21. The metering valve 12 can have a valve device 1 according to the invention (see the detail in FIG. 6b). In the illustrated detail in FIG. 6b, there are two valve devices 1; a first valve device 1 is provided for closing a discharge opening 13 of the metering valve 12 and a second device 1 is provided for closing off a recirculation line 15 leading back to the storage container 20. Further valve devices 1 can be used as desired at required positions.

LIST OF REFERENCES 1 valve device
2 closure device
3 valve opening of the valve device
4 seat of the closure device
5 needle of the closure device
51 front region of the needle
52 rear region of the needle
6 needle mounting of the needle
7 seat mounting of the seat
8 force storage means
9 elastically deformable portion
10 sensor
11 evaluation device
12 metering valve
13 discharge opening
14 intake opening
15 recirculation line
16 metering device
17 bevel
18 cross-sectional weakening of the seat
19 part-elastic or elastic layer
20 storage container
21 line
22 pump
P0, P1, P2, P3 positions of the needle
F contact pressing force

The invention claimed is:

1. A valve device for at least one liquid plastic component or liquid plastic, comprising:
a closure device including a seat and a needle to be pressed against the seat for closing a valve opening of the valve device, the needle being movable relative to the seat in a closing direction to a first closed position in which the needle contacts the seat without any pressing force, a second closed position beyond the first closed position in which the needle is pressed against the seat with a first pressing force, and a third closed position beyond the second closed position in which the needle is over-pressed against the seat with a second pressing force greater than the first pressing force;
a sensor for monitoring at least one of (i) a position of the needle, (ii) a position of the seat, (iii) a needle mounting, and (iv) a seat mounting, and generating a status signal indicating whether the needle is positioned relative to the seat in the first closed position, the second closed position, or the third closed position based on the monitoring;

an evaluation device for receiving the status signal from the sensor and determining a characteristic of an operation of the closure device based on the status signal;

wherein at least one of the needle and the seat is adapted to be yielding or mounted yieldingly.

2. The valve device as set forth in claim 1, wherein at least a portion of at least one of the needle and the seat comprise plastic.

3. The valve device as set forth in claim 2, wherein the plastic of the at least one of the needle and the seat is at least partially elastically deformable.

4. The valve device as set forth in claim 2, wherein the plastic of the at least one of the needle and the seat is PEK.

5. The valve device as set forth in claim 2, wherein the plastic of the at least one of the needle and the seat is PEEK.

6. The valve device as set forth in claim 1, wherein at least one of the needle and the seat is mounted yieldingly by a respective mounting, wherein the mounting has a force storage member or a deformable portion.

7. The valve device as set forth in claim 6, wherein the mounting has a force storage member or an elastically deformable portion.

8. The valve device as set forth in claim 1, wherein the sensor is configured to perform contact-less monitoring.

9. The valve device as set forth in claim 8, wherein the evaluation device stores at least two positions characteristic of predetermined closure states of the closure device.

10. A metering valve for providing a metered discharge of at least one liquid plastic component or liquid plastic, the metering valve comprising the valve device as set forth in claim 1.

11. The metering valve as set forth in claim 10, wherein a discharge opening of the metering valve is closeable by the valve device.

12. The metering valve as set forth in claim 10, further comprising a recirculation line, wherein the valve device is configured to close an intake opening of the recirculation line.

13. A metering device comprising:
a storage container for liquid plastic or at least one liquid plastic component; and
the metering valve as set forth in claim 10 connected to the storage container.

14. The metering device as set forth in claim 13, wherein the valve device of the metering valve is a first valve device, further comprising a second valve device in a recirculation line.

* * * * *